United States Patent
Heckmann et al.

(10) Patent No.: US 6,427,956 B1
(45) Date of Patent: Aug. 6, 2002

(54) ARMREST FOR A MOTOR VEHICLE SEAT

(75) Inventors: Thomas Heckmann, Aidlingen; Holger Hoerner, Boeblingen; Franz Krischen, Althengstett; Christian Wobst, Horb, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/307,027

(22) Filed: May 7, 1999

(30) Foreign Application Priority Data

May 7, 1998 (DE) .......................................... 198 20 336

(51) Int. Cl.⁷ ................................................. B68G 5/00
(52) U.S. Cl. .............. 248/118; 248/292.14; 297/411.38
(58) Field of Search ........................... 248/118, 292.14, 248/288.11; 16/348, 357, 325; 297/411.38, 411.32, 411.29

(56) References Cited

U.S. PATENT DOCUMENTS

| | | | | |
|---|---|---|---|---|
| 3,231,927 A | * | 2/1966 | Ammon ........................ | 16/241 |
| 3,909,063 A | | 9/1975 | Bonisch et al. .............. | 297/113 |
| 4,400,033 A | | 8/1983 | Pietsch ........................ | 297/417 |
| 4,485,524 A | * | 12/1984 | Neville ........................ | 16/241 |
| 4,807,935 A | * | 2/1989 | King ............................ | 297/417 |
| 4,882,807 A | | 11/1989 | Frye et al. ..................... | 16/225 |
| 4,953,259 A | | 9/1990 | Frye et al. ..................... | 16/225 |
| 5,292,171 A | | 3/1994 | Harrell ......................... | 297/113 |
| 5,597,209 A | * | 1/1997 | Bart et al. ............. | 297/411.38 |
| 5,669,107 A | * | 9/1997 | Carlsen et al. ................ | 16/348 |

FOREIGN PATENT DOCUMENTS

| | | |
|---|---|---|
| DE | 30 36 302 | 4/1982 |
| DE | 34 14 316 | 10/1985 |
| DE | 3615261 A1 | 11/1987 |
| DE | 4035856 C2 | 5/1992 |
| DE | 44 37 244 | 4/1996 |

* cited by examiner

Primary Examiner—Leslie A. Braun
Assistant Examiner—Gwendolyn Baxter
(74) Attorney, Agent, or Firm—Crowell & Moring LLP

(57) ABSTRACT

An armrest for a motor vehicle seat that can be attached by a bearing device and is pivotable about a pivot axis between two latching locations of a bearing device that delimit the pivoting range. A stop that moves with the armrest is associated with these latching locations. The bearing device has two assembled parts and has a flexible sliding element that brakes the pivoting movement of the armrest and latches the end positions of the armrest. The flexible sliding element is integrated in one piece into one part of the bearing device, and this one part consists of a one-piece molded plastic part.

21 Claims, 3 Drawing Sheets

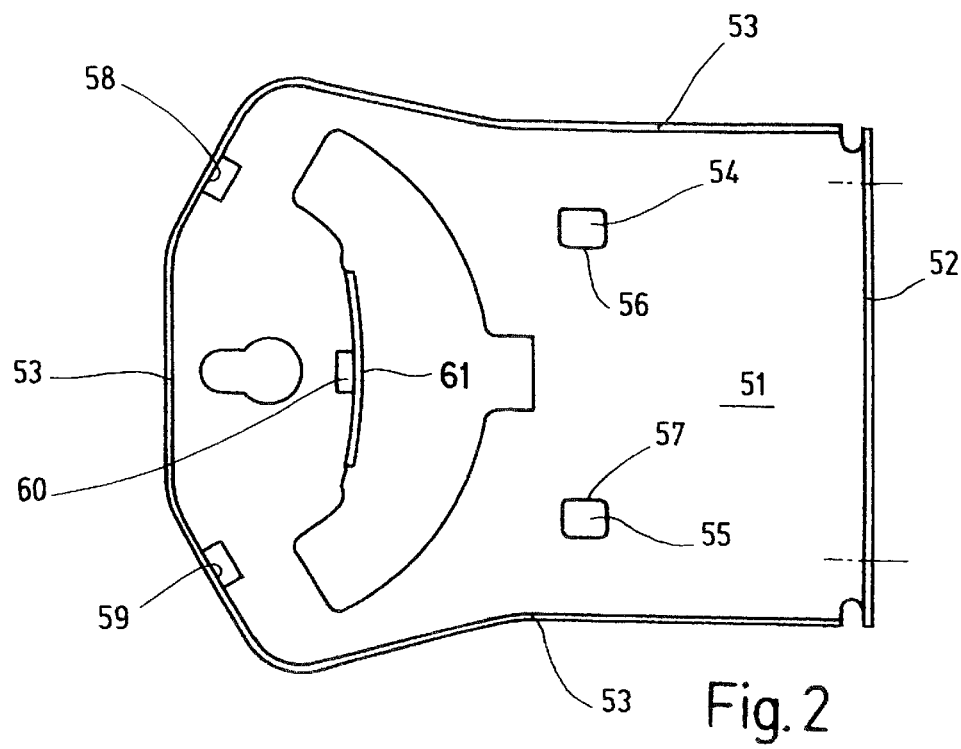
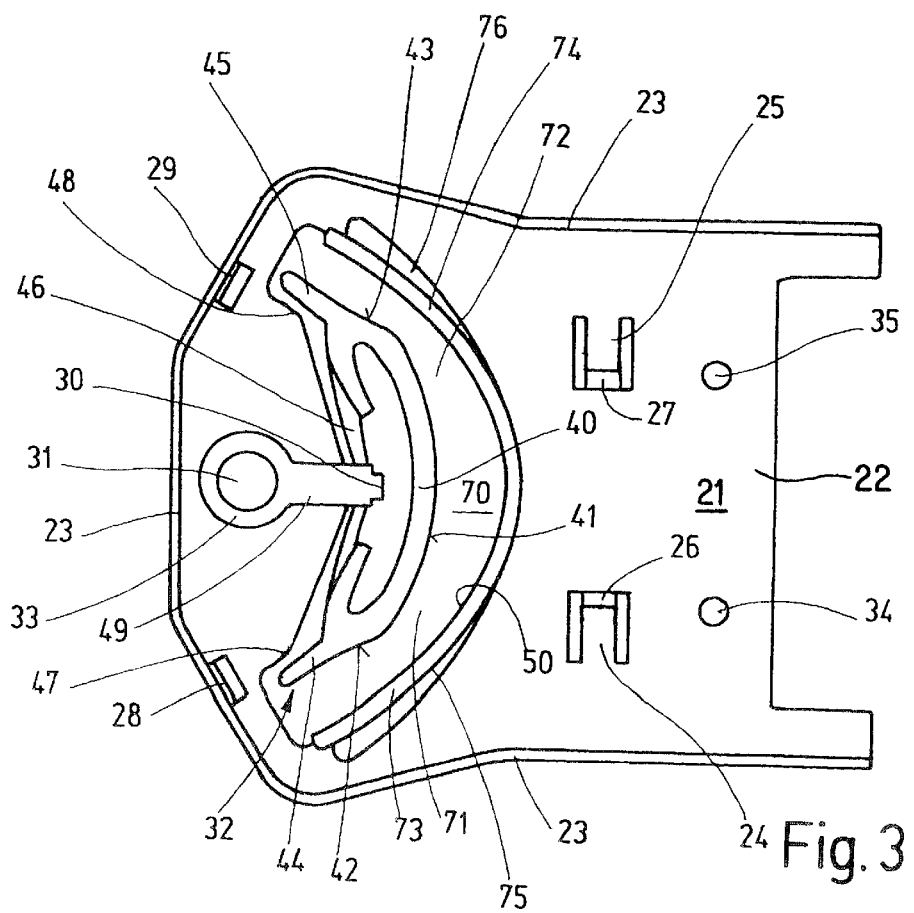

ARMREST FOR A MOTOR VEHICLE SEAT

BACKGROUND AND SUMMARY OF THE INVENTION

This application claims the priority of German application 198 20 336.5-16, filed in Germany on May 7, 1998, the disclosure of which is expressly incorporated by reference herein.

The invention relates to an armrest for a motor vehicle seat which is pivotally movable between two latching locations.

In a known armrest of this type (German Patent Document No. DE 40 35 856 C2), the bearing device has two bearing housings that fit together and are preferably made of sheet metal. In this housing arrangement, a latching lever that can disengage when a specified vehicle deceleration occurs as well as a flexible sliding element are mounted and contained with the sliding element braking the pivoting movement of the armrest latching the end positions of the armrest. The sliding element consists of an independent molded plastic part fitted exactly into the two-piece bearing housing.

A goal of the invention is to provide an armrest of the species recited at the outset in which the bearing device is simplified, reducing the components and simplifying assembly.

This goal is achieved in an armrest for a motor vehicle seat attachable by means of a bearing device and a pivot axle and pivotable between two latching locations of the bearing device that delimit the pivoting range around a pivot axis, a stop that moves with the armrest being associated with said latching locations, with the bearing device having first and second assembled parts and a flexible sliding element that brakes the pivoting movement of the armrest and latches the end positions of the armrest, wherein the flexible sliding element is integrated in one piece into the first part of the bearing device.

Because the flexible sliding element is a one-piece component of one part of the bearing device, this bearing device is reduced to only two approximately plate-shaped parts. This reduces the number of components. The manufacturing cost for the single part that is accordingly made of a one-piece sliding element can be still further reduced, especially by designing it as a molded plastic part. The two parts can be combined into one unit rapidly and simply. This simplifies assembly of the bearing device.

Other objects, advantages and novel features of the present invention will become apparent from the following detailed description of the invention when considered in conjunction with the accompanying drawings.

BRIEF DESCRIPTION OF THE DRAWINGS

FIG. 2 is a side view of a part of the bearing device of FIG. 1 with its second part removed;

FIG. 3 is a side view of the inside of the other part of the bearing device of FIG. 1.

DETAILED DESCRIPTION OF THE DRAWINGS

Figure 1:
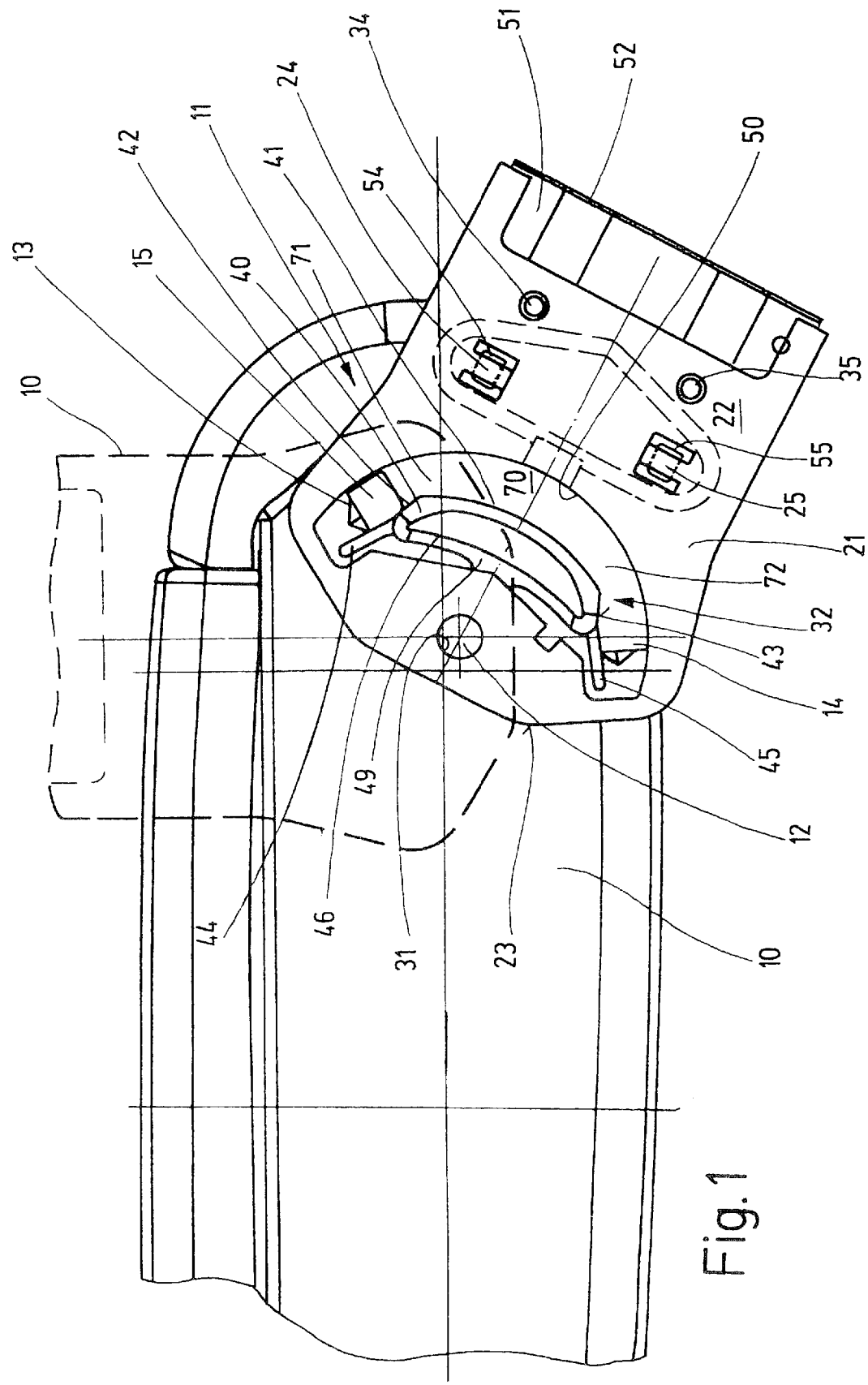
FIG. 1 is a schematic side view of an armrest with a bearing device, wherein the armrest is folded down, its raised position being indicated by dashed lines, constructed according to a preferred embodiment of the present invention.
Figure 4:
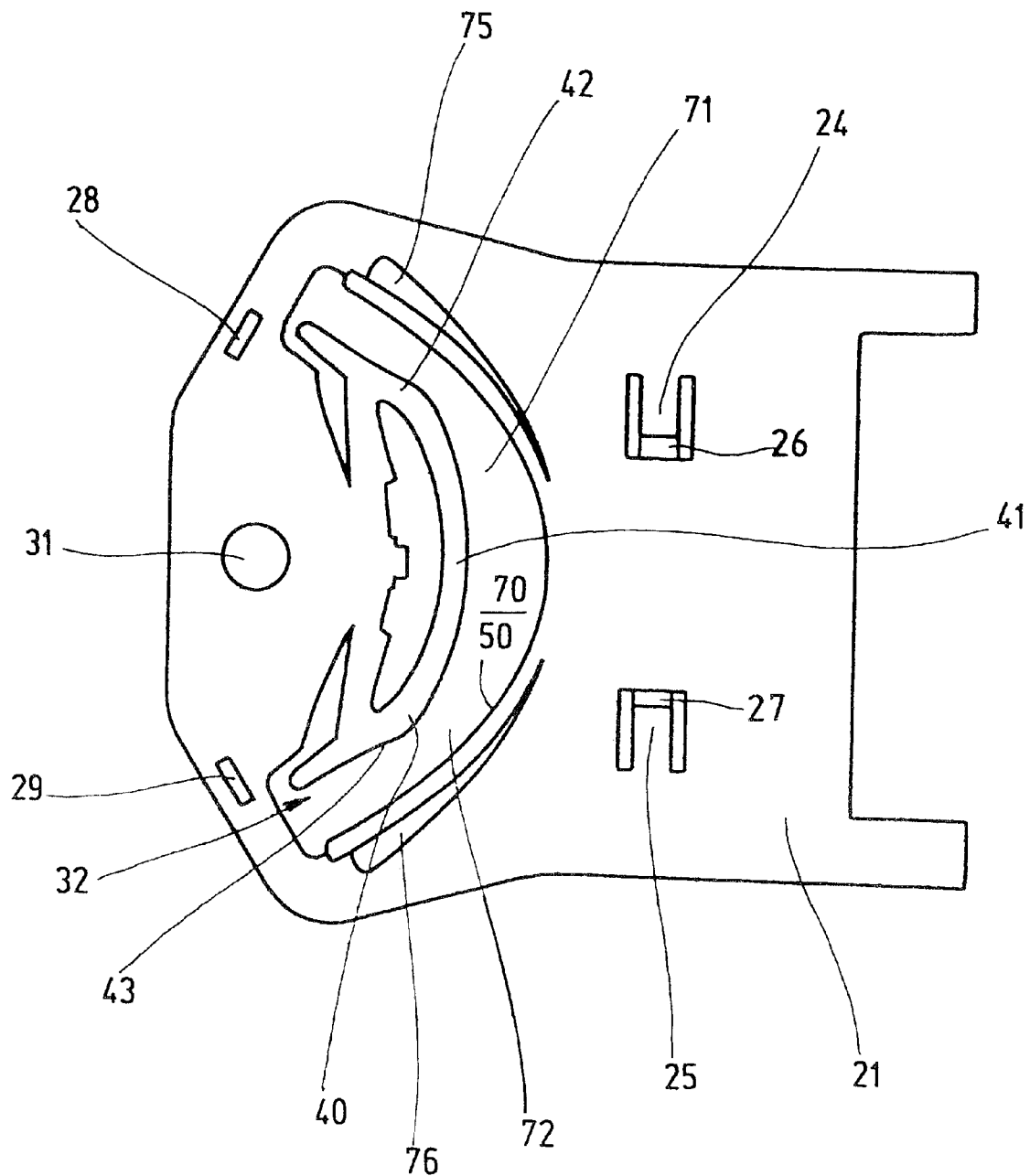
FIG. 4 is a side view of the outside of the other part of the bearing device.

FIG. 1 shows schematically an armrest 10 for a motor vehicle seat, for example for a back seat, which is attachable by bolts on both sides by means of identically designed bearing devices 11 on a seat back (not shown) or a separate frame or the like. Armrest 10 can be pivoted around a pivot axis 12 between two latching locations 13, 14 of bearing device 11 that delimit the pivoting range. A stop 15 that moves with armrest 10, and can consist of a pin, is associated with latching locations 13, 14 contained in bearing device 11.

Bearing device 11 has two parts 21 and 51 that fit together and are assembled in a functional position. The first part 21 is located on the side facing away from armrest 10 and the second part 51 is located on the side facing armrest 10. Bearing device 11 also has a flexible sliding element 32 that performs a braking action during the pivoting movement of the armrest and latches the end positions of armrest 10. Sliding element 32 is thus integrated in one piece into one part 21 of bearing device 11. This one part 21 consists of a one-piece plastic part and is in the shape of a plate 22. The other part 51 is designed as an essentially flat piece of sheet metal and is provided, on the right-hand edge in FIG. 2, with a flange 52 bent down at approximately right angles; this flange serves for attaching bearing device 11 to the vehicle.

Both parts 21 and 51 have edgewise ribs that fit into one another, for example in the form of circumferential projecting edges 23 and 53 respectively, which mesh when the two parts 21, 51 are assembled with the support of these parts. In the embodiment shown, the dimensions of the first part 21 are chosen so that its edge 23 overlaps externally the edge 53 of second part 51.

Both parts 21, 51 are held together by fastening members that interlock shapewise. These fastening members can generally be formed by projections, tongues, clips, or the like that engage recesses. In the embodiment shown, the first part 21 for example has two spring tongues 24, 25 with latching hooks 26, 27, which fit through associated window-like openings 54, 55 in second part 51 and can grip edges 56, 57 associated with latching hooks 26, 27 shapewise from below. In addition, approximately nose-shaped projections 28, 29 are provided on edge 23, and can engage associated openings 58, 59 that extend into edge 53 so that, when the two parts 21, 51 are assembled, projections 28, 29 grip edge 53 shapewise from below in the vicinity of openings 58, 59. The first part 21 also has a tongue-like projection 30, which can enter an associated opening 60 in part 51 and can grip edge 61, bent upward at this point, shapewise from below. Spring tongues 24, 25, as well as projections 28, 29 and projection 30, are all provided on first part 21, namely the molded plastic part, and are formed there at the same time during manufacture. This part also has, in the vicinity of pivot axis 12, a bore 31 with a hub 33. Hub 33 can serve as a spacer when the two parts 21, 51 fit together to set a distance between them. First part 21 also has projections 34, 35 that project at a distance next to spring tongues 24, 25, and can also serve as spacers.

The part 21, that accordingly has a one-piece sliding element 32, also has an approximately arcuate support part 40 which, on its outer side facing away from bore 31, has a track 41 for the stop 15 that travels on it when armrest 10 pivots. This track 41 is designed to slope downward in the vicinity of both ends 42, 43. The approximately arcuate support part 40 has freely projecting tongues 44, 45, which can be flexible, in the vicinity of the two down-sloping ends 42, 43. Approximately in the portion of the track 41 formed by the outer surface, which portion extends between tongues 44, 45, support part 40 is reinforced by an arcuate section 46 that extends at a distance from track 41. The entire approximately arcuate support part 40 can be flexed to one or the other side of the arc. As shown in FIG. 1, stop 15 presses against upper tongue 44, which flexes in an approximately spring-elastic fashion. In the other pivot position of armrest 10, similarly, the other tongue 45 is impacted with latching of this end position, so that it flexes. To support flexible tongues 44, 45, stops 47, 48 are provided on part 21, which the tongues 44, 45 strike as they limit the spring travel. Support part 40 is held by a stable center rib 49 that supports projection 30 and hub 33.

First part 21 has an approximately arcuate guide path 50 that extends at a distance from track 41. Guide path 50 has an approximately arcuate slotted link 70 between track 41 and guide path 50 for stop 15 that is integral with the armrest. The width of this link 70 decreases toward each side of the arc forming groove narrowings 71, 72. These constrictions in the form of groove narrowings 71, 72 cause armrest 10, as it pivots into one end position or the other, also to be flexibly braked before 5 armrest 10 reaches the respective end position. The approximately arcuate guide path 50 is formed on each side of the arc at least partially by flexible ribs 73, 74, each of which is formed by a slot-shape material recess 75 or 76.

The bearing device 11 provided on both sides of armrest 10 to mount it is simple, economical, and readily assembled. It consists of only the first part 21 in the form of a molded plastic part, on which all the functional elements are molded in one piece, and of second part 51 in the form of a shaped sheet-metal part aligned with flange 52 for attaching bearing device 11 at the same time.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Armrest for a motor vehicle seat attachable to said vehicle by a bearing device and a pivot axle are pivotable between two latching locations of the bearing device that delimit a pivoting range around a pivot axis, a stop that moves with the armrest being associated with said latching locations, with the bearing device having first and second assembled parts and a flexible sliding element that brakes a pivoting movement of the armrest and latches end positions of the armrest, wherein the flexible sliding element is integrated in one piece into the first part of the bearing device.

2. The armrest according to claim 1, wherein the first part having the flexible sliding element is made of plastic.

3. The armrest according to claim 2, wherein the first part having the flexible sliding element is made in the shape of a plate, and the second part is made as a flat sheet-metal part and is designed to be attached to a vehicle.

4. The armrest according to claim 3, wherein both the first and second parts of the bearing device have edgewise ribs that interlock.

5. The armrest according to claim 1, wherein the first part having the flexible sliding element is made in the shape of a plate, and the second part is made as a flat sheet-metal part and is designed to be attached to a vehicle.

6. The armrest according to claim 1, wherein both the first and second parts of the bearing device have edgewise ribs that interlock.

7. The armrest according to claim 1, wherein both the first and second parts are held together by fastening members that interlock shapewise.

8. The armrest according to claim 7, wherein the fastening members are projections, tongues, or clips, and are components of the first part that has the flexible sliding element integral therewith.

9. The armrest according to claim 1, wherein the first part that has the flexible sliding element integral therewith has an approximately arcuate support part which forms a track on an outside surface of said first part that faces the stop that is attached to the armrest and has an approximately arcuate guide path at a distance from the track, and wherein an approximately arcuate slotted link for the stop that is attached to the armrest is formed between the track and the guide path.

10. The armrest according to claim 9, wherein the track is formed with a downward slope in an area of both ends.

11. The armrest according to claim 10, wherein the approximately arcuate support part has freely projecting tongues in the area of both ends.

12. The armrest according to claim 11, wherein the approximately arcuate support part is flexible to one side of an arc or the other side of the arc.

13. The armrest according to claim 11, wherein the width of the approximately arcuate slotted link narrows toward each side of an arc forming a groove narrowing on each side.

14. The armrest according to claim 9, wherein the approximately arcuate support part is flexible to one side of an arc or the other side of the arc.

15. The armrest according to claim 14, wherein the width of the approximately arcuate slotted link narrows toward each side of the arc forming a groove narrowing on each side.

16. The armrest according to claim 9, wherein the width of the approximately arcuate slotted link narrows toward each side of an arc forming a groove narrowing on each side.

17. The armrest according to claim 16, wherein the approximately arcuate guide path is formed on each side of the arc at least partially by flexible ribs.

18. The armrest according to claim 17, wherein the approximately arcuate guide path is formed on each side of the arc at least partially by flexible ribs.

19. The armrest according to claim 9, wherein the approximately arcuate guide path is formed on each side of an arc at least partially by flexible ribs.

20. The armrest according to claim 19, wherein each flexible rib is formed by approximately slot-shaped material recesses.

21. A method of making an armrest for a motor vehicle seat, said armrest having a pivot axle and pivotable between two latching locations of a bearing device that delimit a pivoting range around a pivot axis, and a stop that moves with the armrest associated with said latching locations, comprising the acts of:

providing the bearing device having first and second assembled parts and a flexible sliding element that brakes a pivoting movement of the armrest and latches end positions of the armrest, and attaching the bearing device directly to the vehicle, wherein the flexible sliding element is integrated in one piece into the first part of the bearing device.

* * * * *